Jan. 13, 1953 P. F. ADAIR 2,625,033
INTERNAL-COMBUSTION ENGINE COMPRESSION TESTER
Filed Oct. 5, 1948
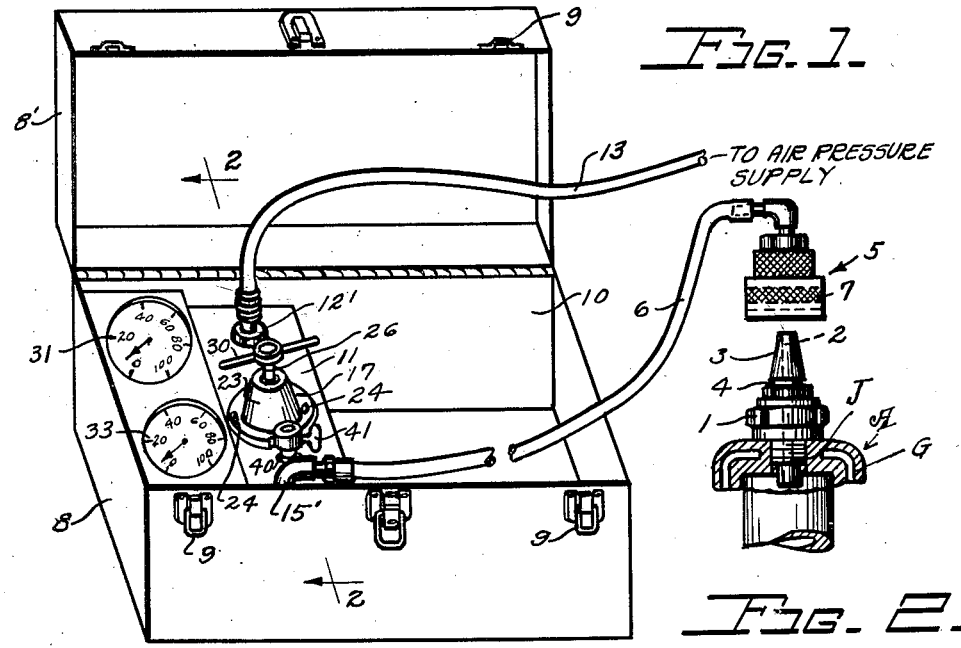
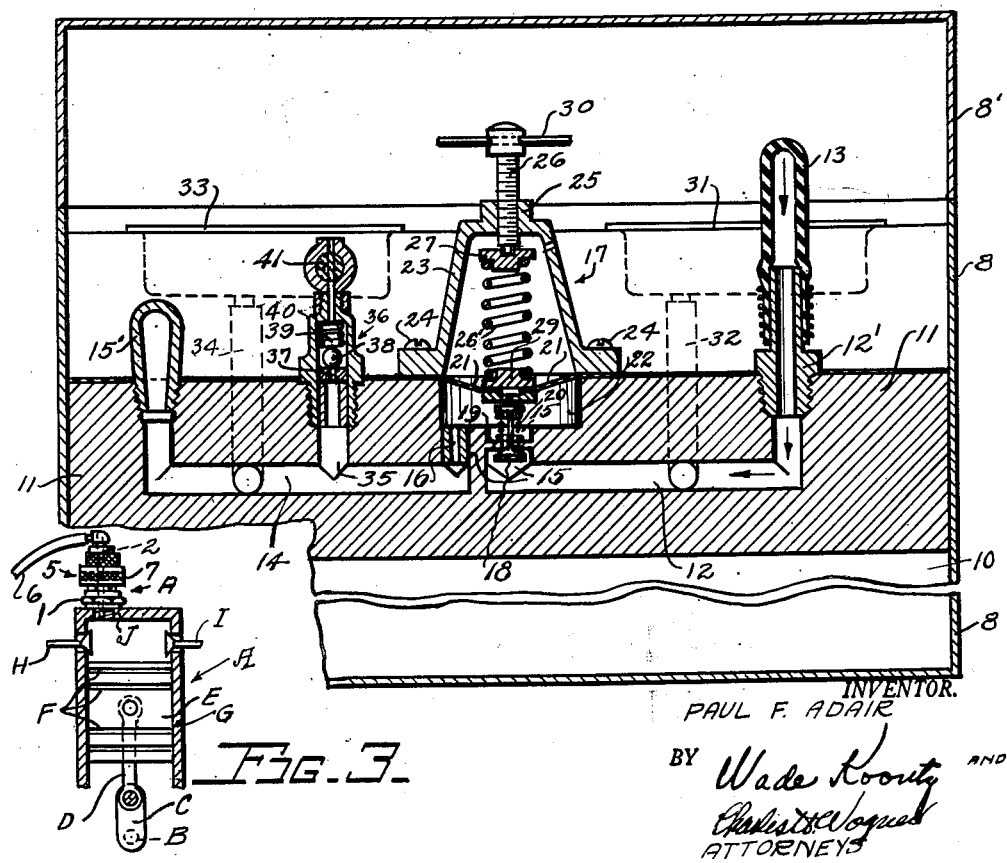
INVENTOR.
PAUL F. ADAIR
BY Wade Koontz AND
Charles H. Vogues
ATTORNEYS Patented Jan. 13, 1953

2,625,033

UNITED STATES PATENT OFFICE 2,625,033

INTERNAL-COMBUSTION ENGINE COMPRESSION TESTER

Paul F. Adair, Dayton, Ohio

Application October 5, 1948, Serial No. 52,967

4 Claims. (Cl. 73—47)

(Granted under Title 35, U. S. Code (1952), sec. 266)

The invention described herein may be manufactured and used by or for the United States Government for governmental purposes without payment to me of any royalty thereon.

This invention relates to compression testing apparatus, and more particularly to internal combustion engine testers, having for an object means for testing and measuring the leakage of gas past the piston, rings, and valves of internal combustion engines to determine the compression holding condition of the engine.

A further object is the provision of internal combustion engine compression testing apparatus having means for applying a relative light predetermined pressure within the cylinder of an internal combustion engine to permit the crankshaft to be rotated manually in either direction against the pressure to set the piston at its top position with the crank on dead center, including separate control means for applying a predetermined testing pressure at a predetermined rate of flow to the cylinder while the piston is at its top position and measuring the relative pressure drop in the pressure supplied to the cylinder to determine the relative pressure fluid leakage past the piston and valves of the engine.

A further object is the provision of compression testing apparatus in which a maximum testing pressure and the rate of flow of the pressure fluid can be predetermined, including separate relief valve venting means for reducing the pressure to a predetermined low value to permit the piston and crankshaft to be manually adjusted to their top and dead center positions against the reduced pressure, including means separate from the maximum or testing pressure control means for closing the venting means to cause application of the testing pressure to the piston after it has been set at its top position in the cylinder.

A further object includes the provision of a testing apparatus having a supply chamber adapted to be connected to a pressure source and a delivery chamber adapted to be detachably connected to the cylinder of an engine to be tested, with a communicating passage between the chambers having a flow restriction therein to regulate the rate of flow from the supply chamber to the delivery chamber and having an adjustable pressure regulator means therein between the supply chamber and the flow restriction to predetermine the testing pressure of the pressure fluid introduced through the flow restriction into the delivery chamber, together with spring loaded valve venting means for reducing the testing pressure within the delivery chamber to permit easy adjustment of the piston within the engine cylinder, and a cut-off valve to close the valve venting means to cause application of the full testing pressure to the engine cylinder, whereby the relative pressure drop between the flow restriction and the cylinder as determined by a pressure gage indicating means connected to the delivery chamber indicates the relative compression holding condition of the engine cylinder.

A further object is the provision of simple compact apparatus for determining compression pressure leaks in internal combustion engine cylinders, including testing pressure control means for supplying a predetermined testing pressure at a regulated rate of flow to an engine cylinder and measuring the pressure drop to determine the compression leakage of the engine cylinder, including the separate pressure reducing means for reducing the testing pressure to a predetermined minimum low pressure so that the crankshaft of the engine may be easily adjusted to move the piston against the reduced pressure to determine the top dead center position of the crankshaft and top position of the piston in the engine cylinder without disturbing the setting of the testing pressure control means.

A further object of the invention is the provision of a compression tester device for multicylinder aircraft engines having a testing pressure control means for applying a predetermined testing pressure to the cylinders of the engine having an air hose pressure line including quick detachable connectors adapted to be inserted into the spark plug openings of the engine and means independent of the testing pressure control means for reducing the testing pressure that is introduced into the cylinders so that the crankshaft and pistons can be adjusted manually to their dead center and top position against a predetermined light pressure without disturbing the setting of the testing pressure control means.

Further objects and advantages of the invention will become apparent from the following description taken in connection with the accompanying drawings in which like reference characters refer to like parts in the several figures.

Fig. 1 is a perspective view of my improved internal combustion engine compression tester, portions of the pressure supply hose being broken away and the detachable connector being shown in separated relation to an air pressure supply spark plug nipple that is inserted in a spark plug opening in the cylinder of an engine, such as an aircraft engine cylinder, the cylinder being shown partly broken away and in section.

Fig. 2 is an enlarged vertical sectional view taken approximately on the line 2—2 in Fig. 1 and Fig. 3 is a somewhat diagrammatic sectional view illustrating an engine crankshaft, piston and cylinder with the air hose pressure supply line for my improved testing device connected to the detachable spark plug opening nipple.

In the drawings the reference letter A indicates an internal combustion engine generally, having a crankshaft B, cranks C to which connecting rods D are connected at one of their ends and at their other ends to the wrist pins of pistons E, the pistons E having the usual piston rings F. The reference letter G denotes the cylinder of the engine A to be tested for compression leakage such as a multicylinder aircraft engine having intake and exhaust valves H and I, and conventional spark plug openings J from which the spark plugs have been removed and spark plug nipples 1 have been inserted and substituted for the plugs, as best seen in Fig. 1. The nipple 1 has a cylindrical bore 2 extending therethrough with a tapered head or tubular extension 3 with an annular shoulder 4 for receiving and detachably interlocking a quick detachable fitting 5 of conventional construction thereto. The fitting 5 has a flexible air pressure supply line or hose 6 connected at one end thereto, the other end of the hose 6 being connected to my improved compression tester device. A rotatable ferrule or locking sleeve 7 is provided on the fitting 5 for quickly attaching or detaching the fitting 5 to or from the spark plug nipple 1.

My testing device proper comprises a rectangular box or receptacle 8 having a hinged cover 8' with suitable fasteners or clips 9 for holding the cover closed with the hose 6, connections, detachable connector 5 and one or more of the spark plug nipples 1 stored in the portion 10 provided for this purpose within the box 8. Secured in one end of the receptacle 8 by any suitable fastening means is an elongated body or casing 11 having a pressure supply chamber or passage 12 formed therein, into which a hose connecting nipple 12' is secured. The nipple 12' has a flexible air hose or pressure supply conduit 13 secured thereto for supplying compressed air or other suitable pressure medium from a compressor or suitable pressure source to the pressure supply chamber 12.

The body 11 is formed with a pressure fluid air delivery chamber 14 therein having an L nipple or fitting 15' to which the end of the flexible air delivery hose 6 is connected. A communicating passage or chamber 15 is formed in the body 11 between the pressure supply chamber 12 and the pressure delivery chamber 14, the passage 15 having a flow restriction 16 therein for regulating the rate of flow of the pressure fluid from the supply chamber 12 to the delivery chamber 14. Interposed in the communicating passage 15 between the flow restrictions 16 and the supply chamber 12 is an adjustable pressure regulator device indicated generally at 17 for controlling the maximum pressure in the chamber 14. The pressure regulator 17 comprises a valve 18 having a valve seat 19, a light spring 20 interposed between the seat 19 and a flange on the stem of the valve yieldably seats the valve 18 on the seat 19. The stem is connected to a flexible diaphragm 21 extending across a chamber 22 forming a part of the communicating passage 15. A cage or spider 23, secured by screw fastenings 24 securely clamps the flexible diaphragm 21 in place, and is threaded to provide a thread guide portion 25 receiving an adjusting pressure regulating screw 26 for regulating the pressure of the pressure medium leaving the pressure regulator 17. The screw 26 bears, at its lower end, against a spring seat or disk 27 engaging one end of a pressure regulating spring 26'. The spring 26' engages a lower spring seat 29 at its other end located on the diaphragm 21 and the outer end of the adjusting screw 26 is provided with manually adjustable handle portions 30. The pressure or tension of the spring 28 on the upper surface of the diaphragm 21, as determined by the adjustment of the regulator screw 26, determines the maximum amount of pressure that can be accumulated in the pressure delivery chamber 14 which can be delivered to the pressure delivery chamber 14 or applied to the interior of the cylinder of the engine being tested.

A pressure gage 31 fitted into the upper flat surface of the body 11 has a conduit 32 in communication with the pressure supply chamber 12, the pressure gage 31 indicating the pressure in the pressure supply chamber 12, the delivery chamber pressure being determined by the setting of the pressure regulator 17. A delivery or testing pressure indicating gage 33 is also fitted into the top of the body 11 adjacent the gage 31, for indicating the pressure within the delivery chamber 14, and consequently indicating the pressure within the cylinder of the engine being tested. This testing or delivery pressure indicating gage 33 is connected through a conduit 34 to the pressure delivery chamber 14 at a point intermediate the flow restriction 16 and the fitting 15' so that the gage 33 will indicate the relative pressure drop between the flow restriction 16 and the engine cylinder G being tested when leakage occurs within the cylinder.

A pressure relief means or venting conduit 35 connects with the pressure delivery chamber 14 at some point between the flow restriction 16 and the delivery hose fitting 15' and includes a venting valve 36 provided having a seat and a flow restricting opening 37 closed by a ball valve 38, yieldably held on the seat by a light coil spring 39. The tension of the spring 39 is predetermined to allow the ball valve 38 to lift and reduce the pressure in the chamber 14 when the pressure within the chamber 14 exceeds a predetermined low pressure value. Mounted in the venting valve fitting 40 is a cut-off valve 41 of the rotary plug valve type, shown in open position in full lines in Fig. 2.

The venting or low pressure regulating valve means including the cut-off valve 41 is separate and independent from the testing pressure regulating valve 17 and therefore once the regulator valve 17 has been set for a predetermined testing pressure it is not necessary to disturb or adjust the setting of the regulator valve 17 when the venting valve means 36 is used. The venting valve means becomes operative when the cut-off valve 41 is opened, for the purpose of setting the engine crankshaft on top dead center position and the tension of the coil spring 39 on the ball valve is such as to permit a reduction of pressure within the fluid pressure delivery chamber effective on the piston in the cylinder of the engine being tested to such a low or predetermined minimum pressure extent that the crankshaft can be rotated manually to adjust the position of the piston against this minimum pressure and the top or dead center position of the piston and crank can easily be felt or located, after which the cut-off valve 41 is closed to allow the testing pressure as controlled by the regulator 17 to build up.

In the operation of my compression testing device, assuming a multicylinder aircraft internal combustion engine is being tested for the relative compression holding condition of the cylinders of the engine, it is desirable that one of the spark plug opening air pressure supply nipples 1 be supplied for each of the cylinders of the engine although the same nipple can be used and transferred from cylinder to cylinder as they are being tested.

The pressure supply hose 13 is first connected to the suitable pressure source or air compressor and the delivery hose 6 is connected through the "quick disconnect" fitting 5 to the spark plug air supply nipple 1 in the first cylinder to be tested. The cut-off valve 41 is opened to vent or reduce the pressure in the delivery chamber 14 to control the pressure in the engine cylinder at a predetermined minimum low value, as determined by the tension of the coil spring on the ball valve 38 and the area of the flow restriction in the venting means relative to the flow restriction 16 in the comunicating passage 15. This "low" pressure on the engine piston can not build up because of the flow restriction 16 controlling the rate of flow into the delivery chamber 14 and of the resiliently yieldable ball valve 38 allowing excess pressure to escape. A sufficient predetermined pressure low is maintained however, in the cylinder and against the piston so that the crankshaft may be manually turned to move the piston against this low pressure. For instance, in an aircraft engine, the propeller may be turned manually to rotate the engine crankshaft and if released the propeller will swing so slowly that no damage or injury to any one or anything in its path is likely, and the dead center position of the engine cranks or top position of the piston can easily be felt and determined by this manual adjustment against this predetermined light pressure as applied to the cylinder by my testing device without disturbing the setting of the testing pressure control means.

Once the dead center position as above indicated is determined the cut-off valve 41 is closed, closing the venting passage through the cut-off valve 41, and the testing pressure will build up in the delivery chamber 14 and in the engine cylinder being tested. The crankshaft previously having been adjusted to its dead center position the piston will remain at its top position in the cylinder. The flow restriction 16 controls the rate of flow of the pressure fluid from the pressure regulator to the delivery chamber and consequently the relative pressure that can be built up within the delivery chamber 14 and the engine cylinder will be determined by the rate of compression leakage in the engine cylinder past the piston, rings, and the valves. Assuming the engine cylinder compression leakage at a predetermined inlet pressure of 100 pounds as controlled by the pressure regulator 17 to be two per cent for a cylinder in good condition, the pressure gage will indicate this slight leakage or drop in pressure and show a testing pressure reading of a predetermined value, say 98 pounds. The process is repeated for each cylinder, the vent passage being first opened to permit the pressure reduction for setting of the crankshaft on dead center for that particular piston and cylinder, after which the cut-off valve is closed to obtain the test pressure reading without disturbing the pressure regulator setting. Should an engine cylinder be in such a condition as to fail to retain the proper or predetermined compression the excessive leakage in that cylinder will reduce the pressure within that cylinder and within the delivery chamber 14, and the condition of this cylinder relative to the compression ratio to the other cylinders or a predetermined pressure value will immediately become apparent from the gage readings of the cylinders.

From the above it will be seen that the condition and compression leakage of any multicylinder engine can quickly and easily be determined with accuracy, the only requirement being that the one spark plug be removed from each cylinder and one of the detachable nipples 1 be inserted in each of the spark plug openings and the nipples 1 progressively connected to the detachable coupling on the pressure fluid delivery line 6 and the testing pressure applied to the delivery hose. The pressure regulator 17 is undisturbed throughout the test of all of the cylinders and will obviate any loss of time or likelihood of any variation of the relative pressure reading due to improper subsequent settings of the regulator 17. Once the dead center position of the crankshaft is determined while the venting passage and valve 41 are open, the closing of this valve causes the application of the exact same testing pressure at the exact same rate of flow to all of the cylinders as they are tested, and gage 33 will accurately indicate the relative degree of compression leakage between the cylinders as they are tested.

I do not intend to limit myself to the specific construction as described in the specification and illustrated in the drawings, as minor changes in details of construction may be resorted to without departing from the spirit of the invention as defined by the following claims.

I claim:

1. An internal combustion engine compression testing apparatus comprising a fluid pressure supply chamber, a fluid pressure delivery chamber, a fluid pressure delivery conduit connected between the supply and delivery chambers, fluid pressure regulator means in said conduit for delivering a pressure fluid at a predetermined pressure through said conduit from said supply chamber to said delivery chamber, a flow restriction between the fluid pressure regulator and the delivery chamber for restricting the rate of flow of the pressure fluid to the delivery chamber, a testing pressure fluid conduit connected to the delivery chamber at one end and adapted to be connected at its other end to an internal combustion engine cylinder for supplying a pressure fluid thereto at a pressure determined by the pressure regulator and at a rate of flow determined by the flow restriction, pressure indicating means connected to the delivery chamber for indicating the pressure in the delivery chamber, pressure venting means in communication with the delivery chamber for venting the delivery chamber including a venting passage having a relief valve therein and flow restriction means therein, resilient means for seating the relief valve to yieldably close the venting passage when the pressure in the delivery chamber falls below the predetermined minimum pressure, and cut-off valve means in the venting passage for closing the venting passage to prevent the escape of the pressure fluid therethrough from the delivery chamber.

2. A compression testing apparatus of the class described comprising a body having therein a pressure fluid supply chamber and a pressure fluid delivery chamber with a communicating passage therebetween, a flow restriction in said passage restricting the rate of flow of a pressure fluid from the supply chamber to the delivery chamber, fluid pressure regulating means in the passage between the supply chamber and the flow restriction for regulating maximum pressure of the fluid passing through the communicating passage and the flow restriction, pressure relief conduit means in communication with the delivery chamber for venting the delivery chamber to reduce the pressure therein to a predetermined maximum pressure, including a pressure opened cut-off having valve means for closing the relief conduit means, spring means in said relief conduit for seating the valve means to close the pressure relief conduit when the pressure in the relief conduit means falls below a predetermined minimum amount and permitting the pressure in the conduit to unseat the valve means to vent the relief conduit means when the pressure in the delivery chamber exceeds the predetermined minimum pressure, separate valve closure means in said pressure relief conduit means for closing the valved pressure relief conduit means to prevent the escape of the pressure fluid therethrough during compression testing of an engine cylinder, a pressure gage connected to the delivery chamber to determine the pressure within the delivery chamber at all times, a flexible pressure fluid supply conductor connected with the interior of the supply chamber and adapted to be connected to a pressure source to supply a pressure fluid to the supply chamber, a flexible pressure fluid delivery conduit connected to the delivery chamber having means thereon for detachably connecting the same to the interior of an internal combustion engine cylinder.

3. A compression testing apparatus for locating the top dead center crankshaft positions of an internal combustion engine and testing the degree of leakage of the compression in the cylinders of the engine when the pistons are at top positions in the cylinders and under fluid pressure comprising; a body having a fluid pressure supply passage formed therein adapted to be connected to a fluid pressure source; a fluid pressure delivery passage formed in the body adapted to be connected to the interior of the cylinder of the engine to be tested for the leakage of pressure past the piston, rings, and valves of that cylinder; a communicating passage formed in the body connecting the supply passage to the delivery passage; a flow restriction in said connecting passage having a restricted flow passage therethrough; a fluid pressure regulator in the communicating passage between the flow restriction and the supply passage for controlling the predetermined maximum pressure in the communicating passage between the flow restriction and the supply passage; venting passage means including a spring closed pressure relief valve in communication with the communicating passage, between the flow restriction and the delivery passage; a flow restriction in said venting passage means having a restricted venting area for venting the communicating passage between the first mentioned flow restriction and the delivery passage to prevent the pressure in that portion of the communicating passage from exceeding a relatively low predetermined pressure when the delivery passage is connected to the cylinder of an engine to be tested and the venting passage means is open, to permit the engine crankshaft to be rotated manually to position the crank for the cylinder and piston being tested at top dead center position against the said low predetermined pressure applied to the piston in that cylinder, said top dead center position being the crank position where the said low predetermined pressure delivered to that cylinder cannot force the piston therein downwardly; a cut-off valve in said venting passage means for closing the venting passage means to cause an increase in the pressure in the communicating passage between the flow restriction and the delivery passage to said predetermined maximum as determined by the fluid pressure regulator and the rate of leakage of the pressure fluid past the piston, rings, and valves of the cylinder being tested, and a pressure gauge connected to said communicating passage between the flow restriction therein and the fluid delivery passage for determining the pressure in that portion of the communicating passage while the delivery passage is connected to the cylinder being tested.

4. In a compression testing apparatus for internal combustion engines; an elongated supporting body having a pressure fluid supply chamber formed therein adjacent one end, a pressure fluid delivery chamber formed in the body adjacent its opposite end and a communicating passage formed in the body connecting the supply chamber to the delivery chamber; a flow restriction disposed in the communicating passage between the supply and delivery chambers having a restricted flow opening therethrough for retarding the flow of a pressure fluid from the supply chamber to the delivery chamber; adjustable fluid pressure regulator means in the communicating passage between the supply chamber and the flow restriction for determining the maximum pressure of the pressure fluid in the communicating passage entering the restricted flow opening; pressure fluid supply conduit means connected to the supply chamber and adapted to be connected to a suitable pressure source, said pressure fluid delivery chamber having a pressure fluid outlet; a pressure fluid delivery hose connected to the outlet at one end and adapted to be connected in communication with the interior of the cylinder to be tested of an internal combustion engine, a pressure indicating guage connected to the communicating passage between the flow restriction and the pressure delivery chamber, for indicating the pressure in the delivery chamber, hose, and the engine cylinder being tested when the hose is connected to that cylinder; a pressure relief conduit connected to the communicating passage between the flow restriction and the delivery conduit for reducing the pressure in the delivery chamber while the hose is connected to the cylinder being tested, a pressure relief valve in said pressure relief conduit; spring means engaging the relief valve to close the same upon reduction of pressure within the delivery chamber and hose below a low predetermined pressure; and shut-off valve means in the pressure relief conduit for closing the relief conduit to permit pressure in the pressure delivery conduit and in the tested cylinder to build up gradually toward the predetermined maximum testing pressure determined by the pressure regulator; whereby when the relief conduit is open a predetermined low pressure is maintained in the delivery chamber and is applicable through the hose to pressurize the tested cylinder at a predetermined low pressure permitting the crankshaft of the engine to be manually turned against the said low pressure in that cylinder to position the piston and crank on top center where said low pressure cannot force the piston downwardly and when the shut-off valve means in the relief conduit is closed pressure in the tested cylinder is built up gradually toward the fluid pressure regulator controlled maximum pressure, and the difference in gauge pressure from a predetermined reference gauge pressure indicates the pressure leakage past the piston, rings, and valves of the cylinder being tested.

PAUL F. ADAIR.

REFERENCES CITED

The following references are of record in the file of this patent:

UNITED STATES PATENTS

| Number | Name | Date |
|---|---|---|
| 18,847 | Hawkins et al. | Dec. 15, 1857 |
| 1,883,522 | Breer | Oct. 18, 1932 |
| 2,212,466 | Bradford | Aug. 20, 1940 |
| 2,285,546 | Wefers | June 9, 1942 |
| 2,352,350 | Smith | June 27, 1944 |
| 2,449,556 | Kirkley | Sept. 21, 1948 |